(12) United States Patent
Sakamoto

(10) Patent No.: US 11,646,577 B2
(45) Date of Patent: May 9, 2023

(54) ELECTRONIC DEVICE AND CONTROL METHOD

(71) Applicant: CANON KABUSHIKI KAISHA, Tokyo (JP)

(72) Inventor: Hiromichi Sakamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 229 days.

(21) Appl. No.: 17/146,753

(22) Filed: Jan. 12, 2021

(65) Prior Publication Data

US 2021/0218332 A1 Jul. 15, 2021

(30) Foreign Application Priority Data

Jan. 15, 2020 (JP) .............................. JP2020-004667

(51) Int. Cl.
*H02J 1/08* (2006.01)
*H02M 1/00* (2006.01)
*H02J 7/00* (2006.01)

(52) U.S. Cl.
CPC ............ *H02J 1/084* (2020.01); *H02J 7/0068* (2013.01); *H02M 1/007* (2021.05)

(58) Field of Classification Search
CPC ......... H02J 1/084; H02J 7/0068; H02M 1/007

USPC ........................................................... 307/28
See application file for complete search history.

(56) References Cited

U.S. PATENT DOCUMENTS

2017/0244318 A1* 8/2017 Giuliano ................. H02M 1/42

FOREIGN PATENT DOCUMENTS

JP 2012-173744 A 9/2012

* cited by examiner

*Primary Examiner* — William Hernandez
(74) *Attorney, Agent, or Firm* — Cowan, Liebowitz & Latman, P.C.

(57) ABSTRACT

An electronic device includes a power receiving unit that receives power from an external device, a first voltage conversion unit that generates a first output voltage regardless of a variation of the input voltage, a second voltage conversion unit in which a second output voltage varies due to a variation of the input voltage, a voltage supply unit that steps up or down the first output voltage or the second output voltage and supplies the output voltage to a load circuit of the electronic device, and a control unit that performs control so as to supply power to the load circuit of the electronic device by switching to the first voltage conversion unit or the second voltage conversion unit based on a voltage supplied to the load circuit of the electronic device.

9 Claims, 11 Drawing Sheets

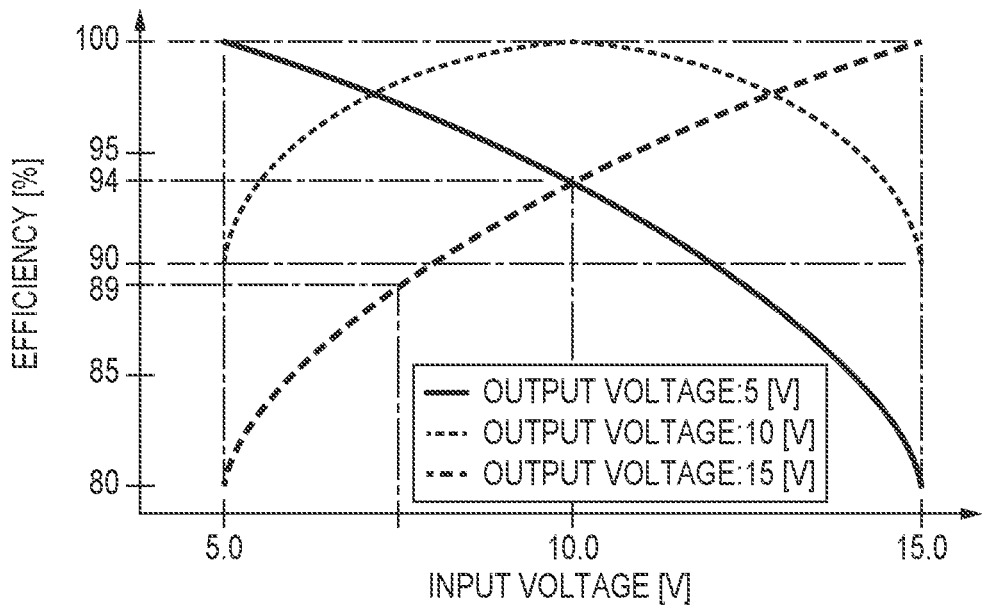
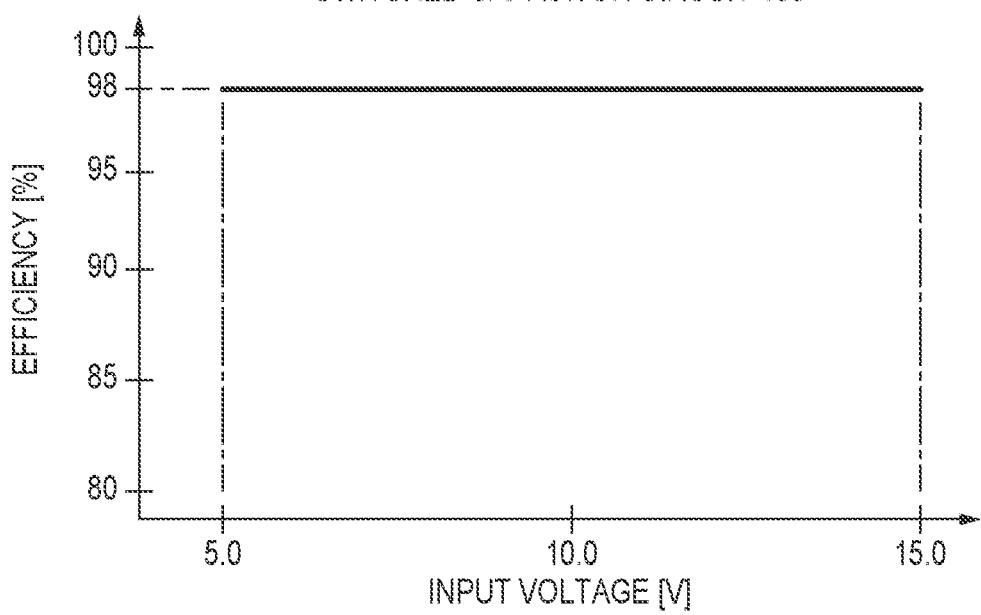

FIG. 3A
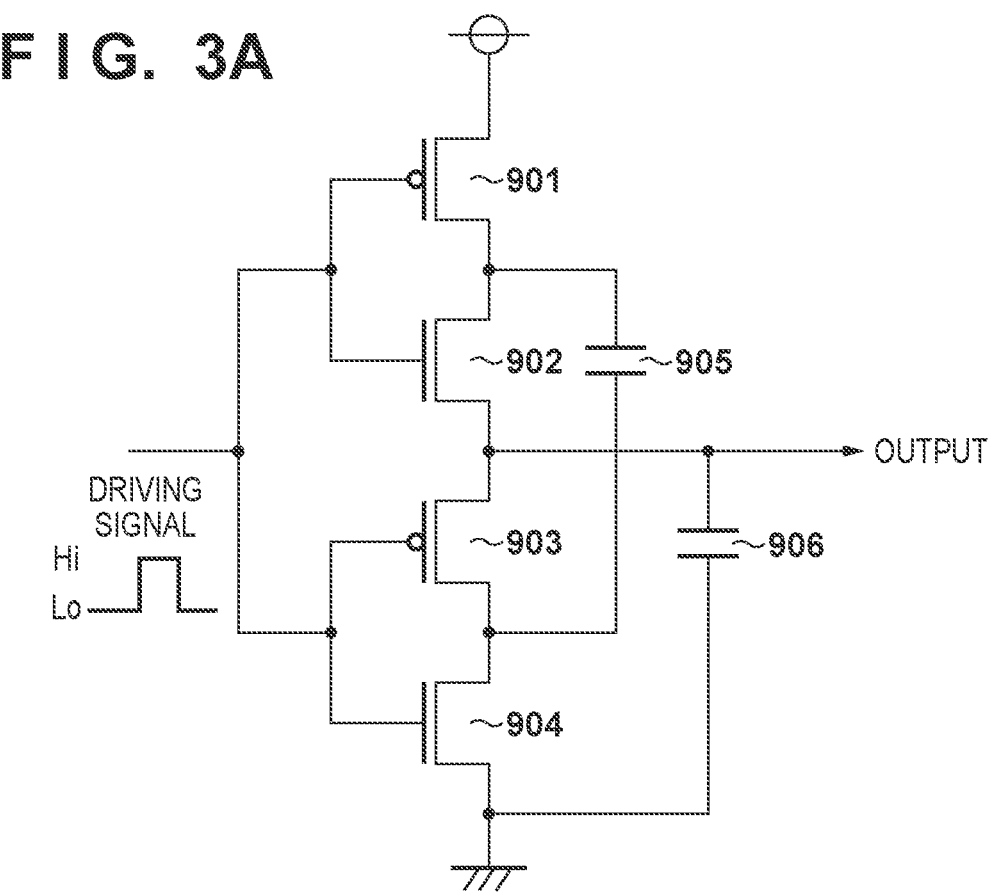
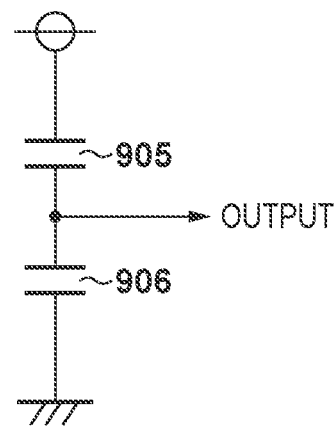
FIG. 3B
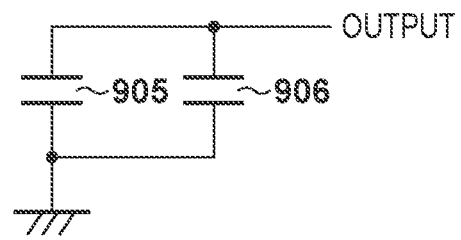
FIG. 3C

FIG. 5
UNIT:[W]
| OPERATION MODE | HIGH VOLTAGE LOAD CIRCUIT 132 | VOLTAGE LOAD CIRCUIT 142 |
|---|---|---|
| STANDBY | 0.4 | 0.4 |
| MOVING IMAGE RECORDING | 0.4 | 10.0 |
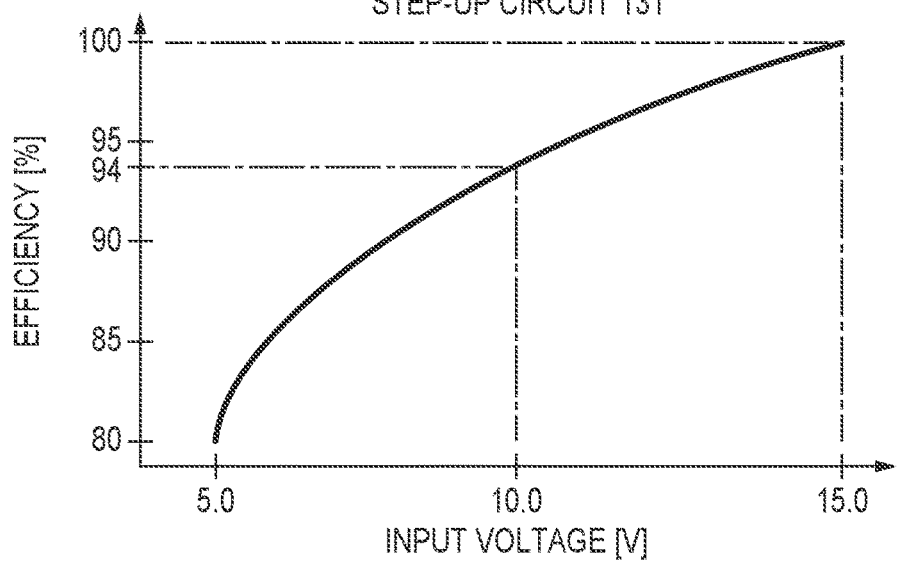
FIG. 6A  CONVERSION EFFICIENCY OF STEP-UP CIRCUIT 131
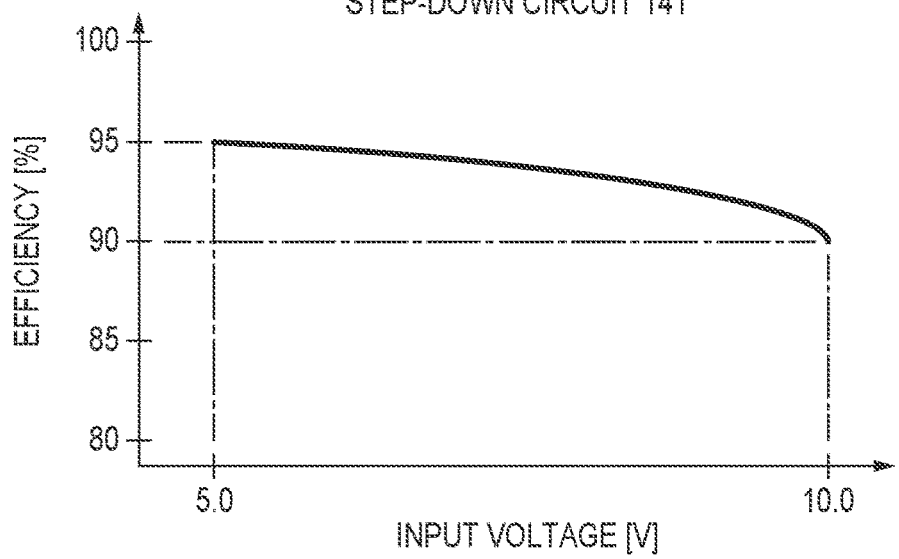
FIG. 6B  CONVERSION EFFICIENCY OF STEP-DOWN CIRCUIT 141

F I G. 7A

POWER SUPPLY PATH TO HIGH VOLTAGE LOAD CIRCUIT 132 AND LOSS THEREIN (LOAD POWER 0.4W)

| INPUT VOLTAGE [V] | VOLTAGE CONVERSION CIRCUIT | | | EFFICIENCY OF STEP-UP CIRCUIT | LOSS [W] |
|---|---|---|---|---|---|
| | CIRCUIT | OUTPUT VOLTAGE [V] | CONVERSION EFFICIENCY | | |
| 5 | LOAD SWITCH CIRCUIT 104 | 5 | 100% | 80% | 0.10 |
| 5 | SWITCHING REGULATOR CIRCUIT 102 | 15 | 80% | 100% | 0.10 |
| 5 | SWITCHED CAPACITOR CIRCUIT 103 | 2.5 | 98% | INOPERATIVE | --- |
| 10 | LOAD SWITCH CIRCUIT 104 | 10 | 100% | 94% | 0.03 |
| 10 | SWITCHING REGULATOR CIRCUIT 102 | 15 | 90% | 100% | 0.04 |
| 10 | SWITCHED CAPACITOR CIRCUIT 103 | 5 | 98% | 80% | 0.11 |
| 15 | LOAD SWITCH CIRCUIT 104 | 15 | 100% | 100% | 0.00 |
| 15 | SWITCHING REGULATOR CIRCUIT 102 | 15 | 100% | 100% | 0.00 |
| 15 | SWITCHED CAPACITOR CIRCUIT 103 | 7.5 | 98% | 90% | 0.05 |

F I G. 7B

POWER SUPPLY PATH TO LOW VOLTAGE LOAD CIRCUIT 142 AND LOSS THEREIN (LOAD POWER 0.4W)

| INPUT VOLTAGE [V] | VOLTAGE CONVERSION CIRCUIT | | | EFFICIENCY OF STEP-DOWN CIRCUIT | LOSS [W] |
|---|---|---|---|---|---|
| | CIRCUIT | OUTPUT VOLTAGE [V] | CONVERSION EFFICIENCY | | |
| 5 | LOAD SWITCH CIRCUIT 104 | 5 | 100% | 100% | 0.00 |
| | SWITCHING REGULATOR CIRCUIT 102 | 5 | 100% | 100% | 0.00 |
| | SWITCHED CAPACITOR CIRCUIT 103 | 2.5 | 98% | INOPERATIVE | --- |
| 10 | LOAD SWITCH CIRCUIT 104 | 10 | 100% | 90% | 0.04 |
| | SWITCHING REGULATOR CIRCUIT 102 | 5 | 90% | 100% | 0.04 |
| | SWITCHED CAPACITOR CIRCUIT 103 | 5 | 98% | 100% | 0.01 |
| 15 | LOAD SWITCH CIRCUIT 104 | 15 | 100% | INOPERATIVE | --- |
| | SWITCHING REGULATOR CIRCUIT 102 | 5 | 80% | 100% | 0.10 |
| | SWITCHED CAPACITOR CIRCUIT 103 | 7.5 | 98% | 93% | 0.04 |

F I G. 7C

POWER SUPPLY PATH TO LOW VOLTAGE LOAD CIRCUIT 142 AND LOSS THEREIN (LOAD POWER 10W)

| INPUT VOLTAGE [V] | VOLTAGE CONVERSION CIRCUIT | | | EFFICIENCY OF STEP-DOWN CIRCUIT | LOSS [W] |
|---|---|---|---|---|---|
| | CIRCUIT | OUTPUT VOLTAGE [V] | CONVERSION EFFICIENCY | | |
| 5 | LOAD SWITCH CIRCUIT 104 | 5 | 100% | 95% | 0.53 |
| | SWITCHING REGULATOR CIRCUIT 102 | 5 | 100% | 95% | 0.53 |
| | SWITCHED CAPACITOR CIRCUIT 103 | 2.5 | 98% | INOPERATIVE | --- |
| 10 | LOAD SWITCH CIRCUIT 104 | 10 | 100% | 90% | 1.11 |
| | SWITCHING REGULATOR CIRCUIT 102 | 5 | 90% | 95% | 1.70 |
| | SWITCHED CAPACITOR CIRCUIT 103 | 5 | 98% | 95% | 0.74 |
| 15 | LOAD SWITCH CIRCUIT 104 | 15 | 100% | INOPERATIVE | --- |
| | SWITCHING REGULATOR CIRCUIT 102 | 5 | 80% | 95% | 3.16 |
| | SWITCHED CAPACITOR CIRCUIT 103 | 7.5 | 98% | 93% | 0.97 |

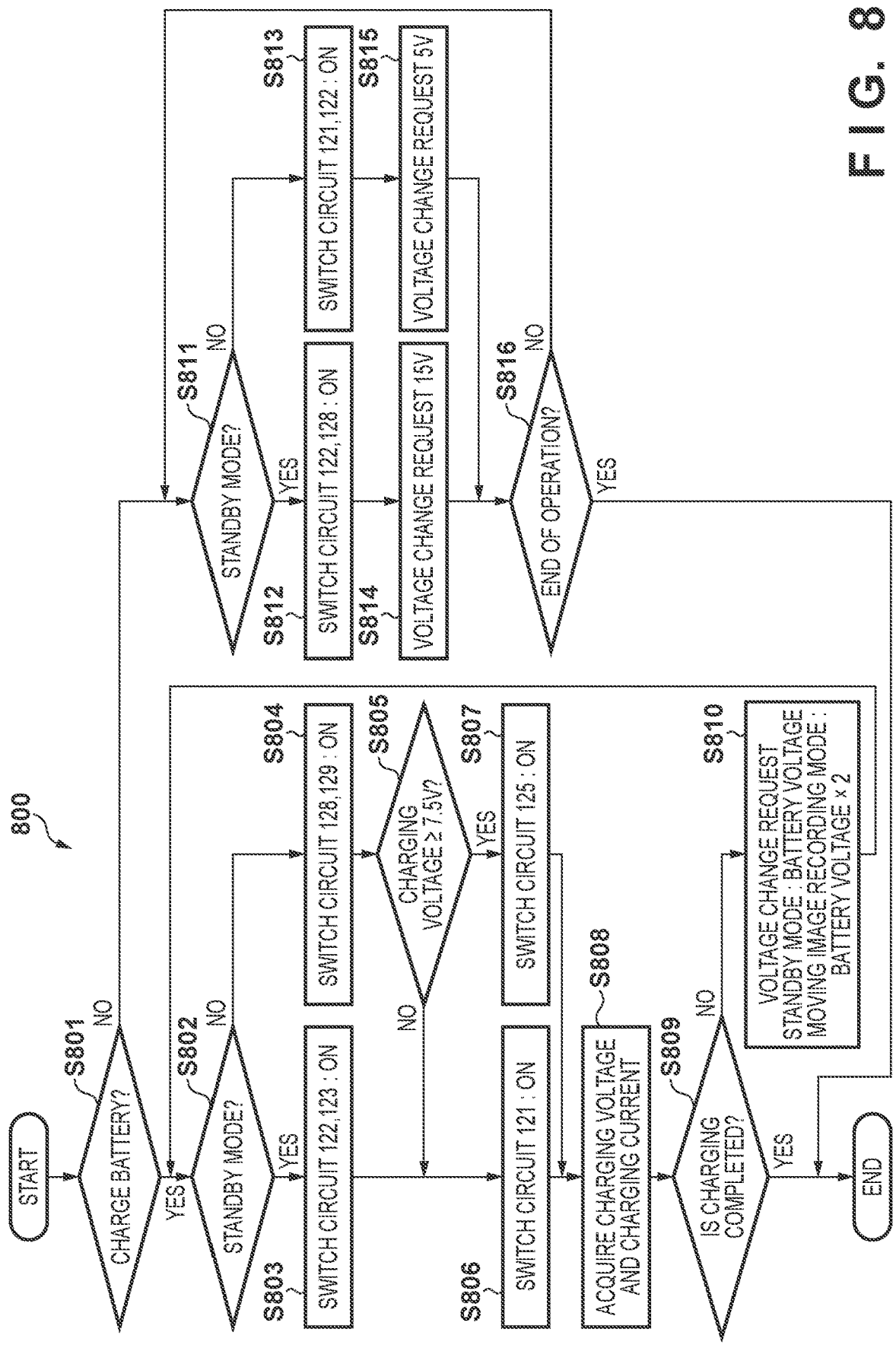

ELECTRONIC DEVICE AND CONTROL METHOD

BACKGROUND

Field of the Invention

Aspects of the disclosure generally relate to an electronic device having a voltage conversion circuit that converts an input voltage to a predetermined output voltage, and a method of controlling such an electronic device.

Description of the Related Art

Japanese Patent Laid-Open No. 2012-173744 discloses a method of controlling so as to use a voltage conversion circuit having a high conversion efficiency in accordance with the operation mode of the electronic device.

By the way, when a characteristic of the voltage conversion circuit that the electronic device has is a characteristic that the output voltage varies by the input voltage, when the input voltage from the external device to the electronic device varies, the desired output voltage within the electronic device may not be obtained.

SUMMARY

According to an aspect of the embodiments, even when the input voltage from the external device to the electronic device varies, such as a device, method in which the desired output voltage is obtained inside the electronic device is provided.

According to an aspect of the embodiments, there is provided an electronic device comprising: a power receiving unit that receives power from an external device; a first voltage conversion unit that generates a first output voltage regardless of a variation of the input voltage; a second voltage conversion unit in which a second output voltage vanes due to a variation of the input voltage; a voltage supply unit that steps up or down the first output voltage or the second output voltage and supplies the output voltage to a load circuit of the electronic device; and a control unit that performs control so as to supply power to the load circuit of the electronic device by switching to the first voltage conversion unit or the second voltage conversion unit based on a voltage supplied to the load circuit of the electronic device.

According to an aspect of the embodiments, there is provided a method comprising: causing a power receiving unit to receive power from an external device; operating a first voltage conversion unit that generates a first output voltage regardless of a variation of the input voltage; operating a second voltage conversion unit in which a second output voltage varies due to a variation of the input voltage; causing a voltage supply unit to step up or down the first output voltage or the second output voltage and supply the output voltage to a load circuit of the electronic device; and controlling such that power is supplied to the load circuit of an electronic device by switching to the first voltage conversion unit or the second voltage conversion unit based on a voltage supplied to the load circuit of the electronic device.

Further aspects of the embodiments will become apparent from the following embodiments.

BRIEF DESCRIPTION OF THE DRAWINGS

FIG. 2A is a diagram illustrating an example of a conversion efficiency of a switching regulator circuit 102.

FIG. 2B is a diagram illustrating an example of a conversion efficiency of a switched capacitor circuit 103.

FIGS. 3A-3C are diagrams illustrating an example of a configuration of a switched capacitor circuit 103.

FIG. 5 is a diagram illustrating an example of a power consumption of a high voltage load circuit 132, and an example of a power consumption of a low voltage load circuit 142.

FIG. 6A is a diagram illustrating an example of a conversion efficiency of a step-up circuit 131.

FIG. 6B is a diagram illustrating an example of a conversion efficiency of a step-down circuit 141.

FIGS. 7A-7C are diagrams illustrating an example of a relationship between a power supply path and a power loss to the high voltage load circuit 132 or the low voltage load circuit 142.

FIG. 8 is a flowchart illustrating an example of a control process of the electronic device 100.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
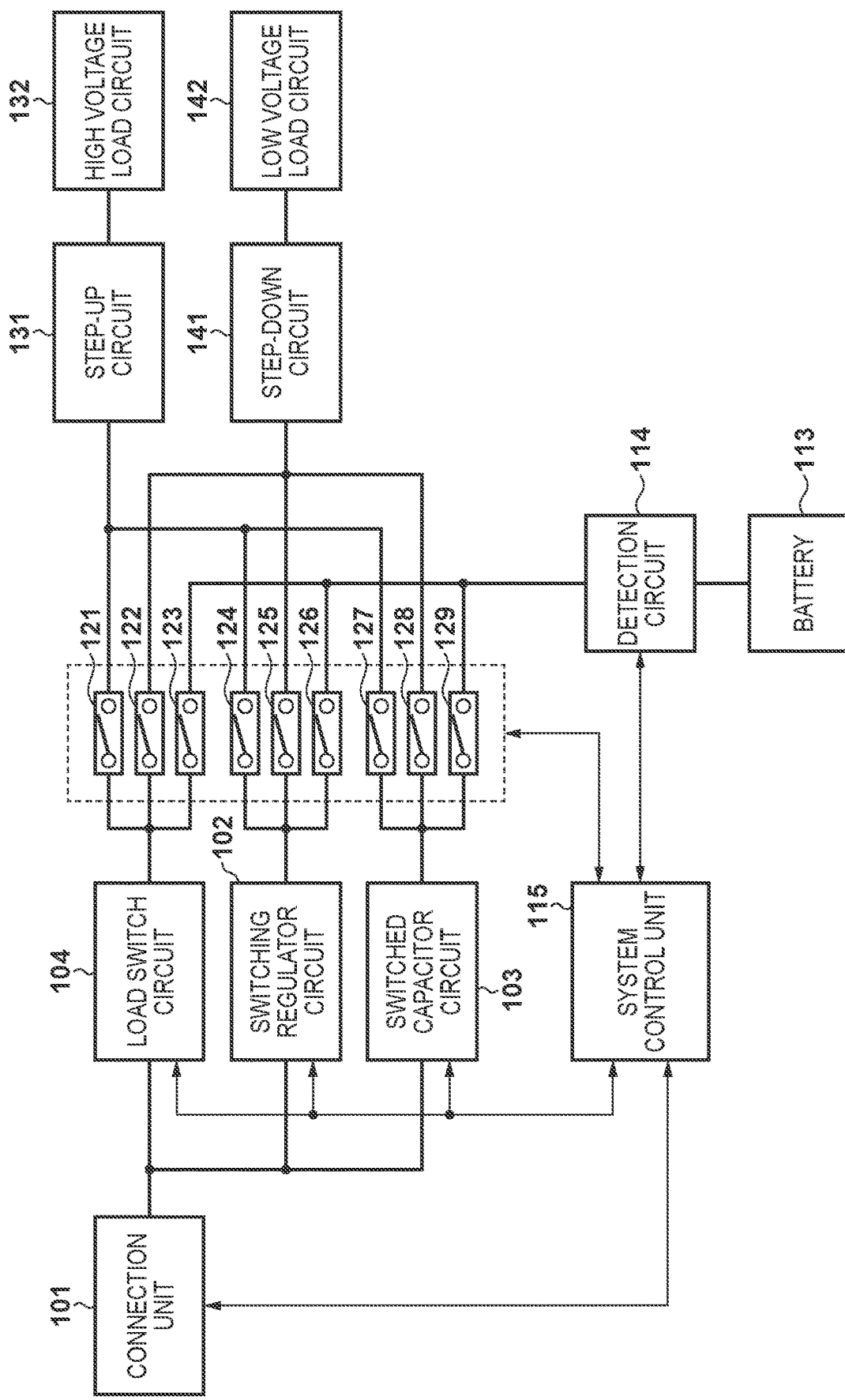
FIG. 1 is a block diagram illustrating components of an electronic device 100 according to a first embodiment.

Hereinafter, components of the electronic device 100 according to the first embodiment will be described with reference to FIG. 1. The electronic device 100 is, for example, an electronic device that can operate as a digital camera, a smart phone, or a tablet terminal. In the first embodiment, a case where the electronic device 100 is an electronic device that can operate as a digital camera, for example, will be described. As long as the electronic device is operable as a digital camera, the electronic device 100 may be any of a digital camera, a smartphone, or a tablet terminal.

The electronic device 100 is connected via a connection unit 101 to a power supply device served as an external device. The connection unit 101 operates as an interface which is compliant with USB Power Delivery (PD) standard and Programmable Power Supply (PPS). In power supply by the PPS, the power receiving device notifies the request voltage to the power supply device by the communication of the PPS, and the power supply device can supply power corresponding to the request voltage to the power receiving device.

A switching regulator circuit 102 is a power supply circuit which performs a voltage conversion with respect to power supplied from the connection unit 101, and steps up or down an input voltage. The switching regulator circuit 102 is a buck-boost type DC/DC converter circuit which comprises, for example, inductor elements, capacitor elements and switching elements. The switching regulator circuit 102 performs a voltage conversion by controlling the switching element to be an ON state or an OFF state. FIG. 2A shows an example of a conversion efficiency of a switching regulator circuit 102. A conversion efficiency of the switching regulator circuit 102 varies with the input voltage and the output voltage. Although the conversion efficiency of the switching regulator circuit 102 is also changed by the load current, the change amount of the conversion efficiency due to the load current in the first embodiment will be described as negligible.

A switched capacitor circuit 103 is a power supply circuit which converts the input voltage into a voltage in which the input voltage is divided by an integer (e.g., ½) with respect to power supplied from the connection unit 101. The switched capacitor circuit 103 is comprised of, for example, a capacitor element and a switching element. FIG. 3A shows an example of a configuration of the switched capacitor circuit 103. As shown in FIG. 3A, the switched capacitor circuit 103 is comprised of switching elements 901-904 and capacitor elements 205 and 206, and performs a switching operation by inputting driving signal to the switching elements 901-904. FIG. 3B is an equivalent circuit diagram in which driving signal to the switching elements 901-904 indicates a state of a high logic level. In FIG. 3B, the switching element 901 and the switching element 903 is in the ON state, the switching element 902 and the switching element 904 is in the OFF state, an intermediate voltage of the capacitor element 905 and the capacitor element 906 is output to the output terminal. FIG. 3C is an equivalent circuit diagram in which a driving signal to the switching elements 901-904 indicates a state of a low logic level. In FIG. 3C, the switching element 901 and the switching element 903 are in the OFF state, the switching element 902 and the switching element 904 are in the ON state, a voltage obtained by connecting the capacitor element 905 and the capacitor element 906 in parallel is output to the output terminal. In this manner, by controlling the state of the switching elements 901-904 to be the ON state or the OFF state, the switched capacitor circuit 103 can output a voltage of ½ of the input voltage.

Power loss occurring in the switched capacitor circuit 103, the switching loss due to the switching operation of the switching element is dominant. Therefore, the switched capacitor circuit 103 has a feature that a conversion efficiency is high as compared with the switching regulator circuit 102 in which a power loss occurs in the switching loss and the inductor element. FIG. 2B shows an example of the conversion efficiency of the switched capacitor circuit 103 for outputting a voltage of ½ of the input voltage as an output voltage.

A load switch circuit 104 is, without performing the voltage conversion, a voltage output circuit for outputting a voltage supplied from the connection unit 101. The load switch circuit 104 is composed of, for example, FETs (Field Effect Transistor). Since the power loss occurring in the load switch circuit 104 occurs only in the on-resistance of the FET, on-resistance uses a FET of about several mΩ. Thus, the power loss of the load switch circuit 104 when supplied with the same power is sufficiently smaller than the switching regulator circuit 102 and the switched capacitor circuit 103. In the first embodiment, it is assumed that there is no power loss in the load switch circuit 104.

The switching regulator circuit 102, the switched capacitor circuit 103 and the load switch circuit 104 is controlled by control signal of a system control unit 115.

The system control unit 115 is a control circuit for controlling the electronic device 100. The system control unit 115 includes a memory that stores a program for controlling the electronic device 100, and a microcomputer that controls the electronic device 100 by executing a program stored in the memory.

Each of the switching circuits 121-129 includes, for example, FETs (Field Effect Transistor). The switching operation of the switching circuits 121-129 is controlled by the system control unit 115.

The switch circuits 121, 124 and 127 are circuits for switching the power supply path to the step-up circuit 131 is controlled by the system control unit 115. The switching regulator circuit 102 is controlled so that the outputs of the switched capacitor circuit 103 and the load switch circuit 104 does not conflict and only one of the switch circuits 121, 124 and 127 is in the ON state.

The switching circuits 122, 125 and 128 are circuits for switching the power supply path to the step-down circuit 141 is controlled by the system control unit 115. The switching regulator circuit 102 is controlled so that the outputs of the switched capacitor circuit 103 and the load switch circuit 104 do not conflict and only one of the switch circuits 122, 125 and 128 is in the ON state.

The switch circuits 123, 126 and 129 are circuits for switching the power supply path to the battery 113 is controlled by the system control unit 115. The switching regulator circuit 102 is controlled so that the outputs of the switched capacitor circuit 103 and the load switch circuit 104 do not conflict and only one of the switch circuits 123, 126 and 129 is in the ON state.

A battery 113 is detachable from the electronic device 100 and is a rechargeable battery, such as a lithium-ion battery. In the first embodiment, a case where a charging voltage range of the battery 113 is 5.0-8.4 [V] will be described.

A detection circuit 114 is a circuit for detecting a charging voltage and a charging current supplied to the battery 113. The charging voltage and the charging current detected by the detection circuit 114 is notified to the system control unit 115.

In the first embodiment, the battery 113 can be charged by a first charging method or a second charging method.

The first charging method performs charging of the battery 113 by controlling the output voltage of the switching regulator circuit 102. In the first charging method, the system control unit 115 puts the switch circuit 125 to be the ON state. Further, the system control unit 115 performs charging of the battery 113, based on the voltage value and the current value notified from the detection circuit 114, by controlling the output voltage of the switching regulator circuit 102 so that the charging voltage and the charging current to the battery 113 to be a predetermined value.

The second charging method performs charging of the battery 113 by controlling the output voltage of the switched capacitor circuit 103. The system control unit 115 communicates with the power supply device connected to the connection unit 101 by PPS.

The system control unit 115 puts the switch circuit 128 to be the ON state, and requests the predetermined voltage to the power supply device via the connection unit 101 based on the voltage value and the current value notified from the detection circuit 114. In the first embodiment, it is assumed that the electronic device 100 performs the communication by PPS at a fixed time interval with the power supply device, requires a voltage twice the charging voltage to the battery 113 to the power supply device, and performs charging of the battery 113 with power from the power supply device.

Comparing the first charging method and the second charging method, the second charging method using the switched capacitor circuit 103 can suppress the power loss than the first charging method using the switching regulator circuit 102. However, the second charging method is necessary for changing the voltage supplied from the connection unit 101 in accordance with the charging voltage to the battery 113.

The charging of the battery 113 is performed by sequentially switching the charging current (or charging power) to the battery 113 in accordance with the charging state of the battery 113. In the first embodiment, the second charging method having high efficiency will be described. Further, an operation example will be described in a case that the charging power is 10 [W].

Figure 4:
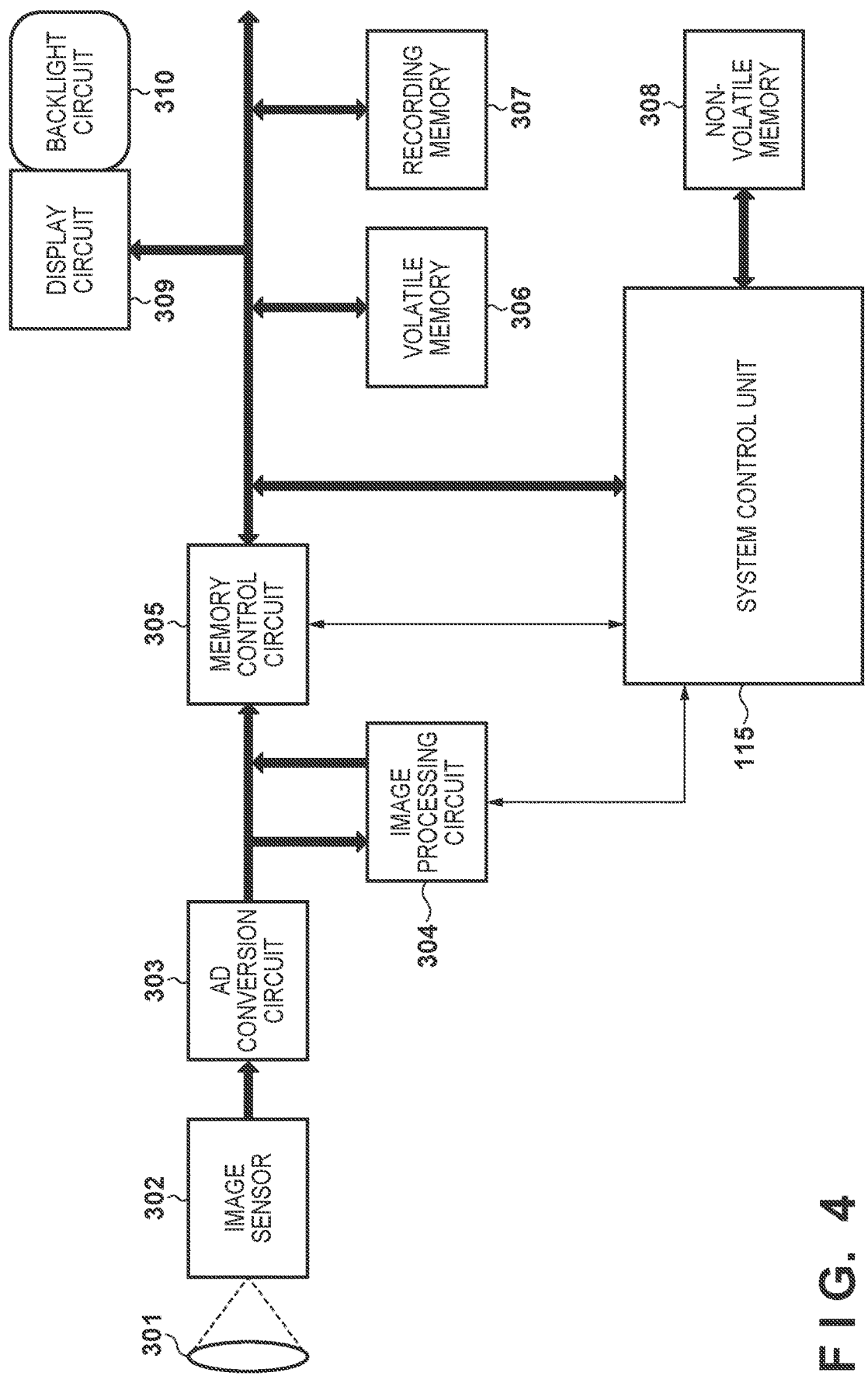
FIG. 4 is a block diagram illustrating components that relate to a camera function of the electronic device 100.

FIG. 4 is a block diagram illustrating components relating to the camera functions of the electronic device 100. Components 303-309 are components supplied with power from the step-down circuit 141. Component 310 illustrates a component that receives power from step-up circuit 131.

Light from an object incident through an optical lens 301 of the electronic device 100 is imaged on the imaging surface of the image sensor 302 made of CMOS or CCD, etc. To an object image formed on the imaging surface of the image sensor 302, after being converted into digital signal by an AD conversion circuit 303, by an image process circuit 304, for example, noise reduction process, image process such as white balance process is performed.

The image processing circuit 304 converts the image data after the image process into a file format such as JPEG (Joint Photographic Experts Group) and records the file format in the recording memory 307. The image processing circuit 304 also performs generation process of VRAM image data for displaying on the display circuit 309. The image process can be performed on the entire area of the image data or on a part of the area of the image data.

A memory control circuit 305 is a circuit that controls writing of image data generated by the AD conversion circuit 303 and the image processing circuit 304 into the memory or reading of image data from the memory.

A volatile memory 306 is a RAM or the like capable of high-speed reading and writing, and is used as a workspace for image process performed by the image processing circuit 304.

A recording memory 307 is a recording medium such as a memory card detachable from the electronic device 100.

A non-volatile memory 308 may be a flash ROM, a EEPROM, or the like, from which data can be read or written. In the nonvolatile memory 308, characteristic data of a display circuit 309, an image processing parameter for performing image process by the image processing circuit 304, and the like are stored.

A display circuit 309 is a display device, such as an LCD (Liquid Crystal Display), an organic EL, arranged on a back side of the electronic device 100.

A backlight circuit 310 is arranged on a back surface of the display circuit 309, for example, a lighting circuit in which white LEDs are connected in series. Since the LCD is the display device which cannot emit light by itself, the LCD becomes visible as a display by irradiating illumination light from the back side.

In the first embodiment, a case where the backlight circuit 310 has five white LEDs connected in series and each of the five white LEDs have the following characteristics will be described.

For example, if VF (forward voltage) of one white LED is 3.75 [V] and IF (forward current) of one white LED is 26.7 [mA], the voltage required to drive the five white LEDs will be 3.75×5=15 [V], and the power consumption of the five white LEDs will be 15×26.7=400 [mW].

The user can change an operation mode of the electronic device 100 to a first operation mode or a second operation mode by operating an operation unit (a switch, a button, a touch panel, or the like). In the first embodiment, for example, a case where the first operation mode is a standby mode and the second operation mode is a moving image recording mode will be described.

FIG. 5 shows an example of the power consumption of the high voltage load circuit 132 and the low voltage load circuit 142 in the standby mode, and an example of the power consumption of the high voltage load circuit 132 and the low voltage load circuit 142 in the moving image recording mode. In FIG. 5, the power consumption of the high voltage load circuit 132 does not change in either the standby mode or the moving image recording mode. The power consumption of the low voltage load circuit 142 is 5 [W] in the moving image recording mode, whereas 0.4 [W] in the standby mode. The power consumption of the low voltage load circuit 142 in the standby mode is reduced because the components of the electronic device 100 operate at a low power consumption.

A step-up circuit 131 is a voltage supply circuit for supplying to the high voltage load circuit 132 by stepping up the input voltage, for example, an inductor element, a boost type DC/DC converter circuit composed of a capacitor element and a switching element. The boost type DC/DC converter circuit, since the conversion efficiency is higher as the difference between the input voltage and the output voltage is small, the higher the input voltage is relatively more efficient. In the first embodiment, a case where the input voltage range of the step-up circuit 131 is 5-15 [V] will be described.

FIG. 6A shows an example of the conversion efficiency of the step-up circuit 131. When the load power is 0.4 [W], the conversion efficiency when the input voltage is the lower limit value 5 [V] is 80 [%], and the conversion efficiency 100 [%] when the input voltage is the upper limit value 15 [V]. In this manner, the conversion efficiency of the step-up circuit 131 becomes better characteristics as the input voltage is higher.

A step-down circuit 141 is a voltage supply circuit for supplying to the low-voltage load circuit 142 by stepping down the input voltage, for example, an inductor element, a capacitor element, a buck type DC/DC converter circuit composed of a switching element. The buck type DC/DC converter circuit, since the conversion efficiency is higher as the difference between the input voltage and the output voltage is small, the lower the input voltage is relatively more efficient. In the first embodiment, a case where the input voltage range of the step-down circuit 141 is 5-10 [V] will be described.

FIG. 6B shows an example of the conversion efficiency of the step-down circuit 141. The conversion efficiency when the input voltage is the lower limit value 5 [V] is 95 [%], the conversion efficiency when the input voltage is the upper limit value 10 [V] is 90 [%]. In this manner, the conversion efficiency of the step-down circuit 141 becomes better as the input voltage is lower, the characteristic becomes better as the load power is higher. Note that although the conversion efficiency of the step-up circuit 131 or the step-down circuit 141 is also changed by the load current, the change amount of the conversion efficiency due to the load current will be described as negligible in the first embodiment.

Next, with reference to FIGS. 7A, 7B and 7C, an example of the relationship between the power supply path and the power loss to the high voltage load circuit 132 or the low voltage load circuit 142 will be described.

In the standby mode, FIGS. 7A and 7B are referred to. For example, if the input voltage is 15 [V], by supplying power to the high voltage load circuit 132 via the load switch circuit 104 or the switching regulator circuit 102, the power loss becomes 0 [W]. For example, if the input voltage is 15 [V], by supplying power to the low voltage load circuit 142 via the switched capacitor circuit 103, the power loss becomes 0.04 [W]. Thus, the power loss in the standby mode becomes the smallest as 0.04 [W] (=0 [W]+0.04 [W]).

In the moving image recording mode, FIGS. 7A and 7C are referred to. For example, if the input voltage is 5 [V], by supplying power to the high voltage load circuit 132 via the load switch circuit 104 or the switching regulator circuit 102, the power loss becomes 0.1 [W]. For example, if the input voltage is 5 [V], by supplying power to the low voltage load circuit 142 via the load switch circuit 104 or the switching regulator circuit 102, the power loss becomes 0.53 [W]. Thus, the power loss in the moving image recording mode becomes the smallest as 0.63 [W] (=0.1 [W]+0.53 [W]).

In this manner, although the power consumption of the high voltage load circuit 132 and the low voltage load circuit 142 changes in accordance with the operation mode of the electronic device 100, by switching the input voltage and the power supply path from the connection unit 101, the power loss can be suppressed.

Next, with reference to a flowchart of FIG. 8, the power supply control in the first embodiment will be described.

The process 800 of FIG. 8 is controlled by the system control unit 115 executing a program stored in the memory of the system control unit 115. Process 800 is started in a state where the battery 113 is connected to the electronic device 100.

In step S801, the system control unit 115 determines whether or not the battery 113 needs to be charged. If it is determined that the battery 113 needs to be charged, the system control unit 115 advances the process 800 to step S802. If it is determined that the battery 113 does not need to be charged, the system control unit 115 advances the process 800 to step S811.

In step S802, the system control unit 115 determines whether or not the operation mode of the electronic device 100 is the standby mode. When the operation mode of the electronic device 100 is determined to be the standby mode, the system control unit 115 advances the process 800 to step S803. If it is determined that the operation mode of the electronic device 100 is not the standby mode (for example, when the operation mode of the electronic device 100 is determined to be the moving image recording mode), the system control unit 115 advances the process 800 to step S804.

In step S803, the system control unit 115 puts the switch circuit 122 and the switch circuit 123 to be the ON state and puts the switch circuit 125, 128, 126 and 129 to be the OFF state. Thus, power is supplied to the step-down circuit 141 and the detection circuit 114 via the load switch circuit 104.

In step S804, the system control unit 115 puts the switch circuit 128 and the switch circuit 129 to be the ON state and puts the switch circuit 122, 125, 123 and 126 to be the OFF state. Thus, power is supplied to the step-down circuit 141 and the detection circuit 114 via the switched capacitor circuit 103.

In step S805, the system control unit 115 determines whether or not the charging voltage to the battery 113 is equal to or higher than 7.5V. If it is determined that the charging voltage to the battery 113 is equal to or higher than 7.5V, the system control unit 115 advances the process 800 to step S807. If it is determined that the charging voltage to the battery 113 is less than 7.5V, the system control unit 115 advances the process 800 to step S806.

In step S806, the system control unit 115 puts the switch circuit 121 to be the ON state and puts the switch circuits 124 and 127 to be the OFF state.

In step S807, the system control unit 115 puts the switch circuit 124 to be the ON state and puts the switch circuits 121 and 127 to be the OFF state.

The input voltage range of the step-up circuit 131 is 5-15 [V]. When the charging voltage to the battery 113 is 7.5V, since the input voltage from the connection unit 101 becomes 15 [V] twice, it is impossible to supply power to the step-up circuit 131 via the load switch circuit 104. For this reason, the determination of the charging voltage is performed in step S805 and the power supply path is switched.

Figure 9A:
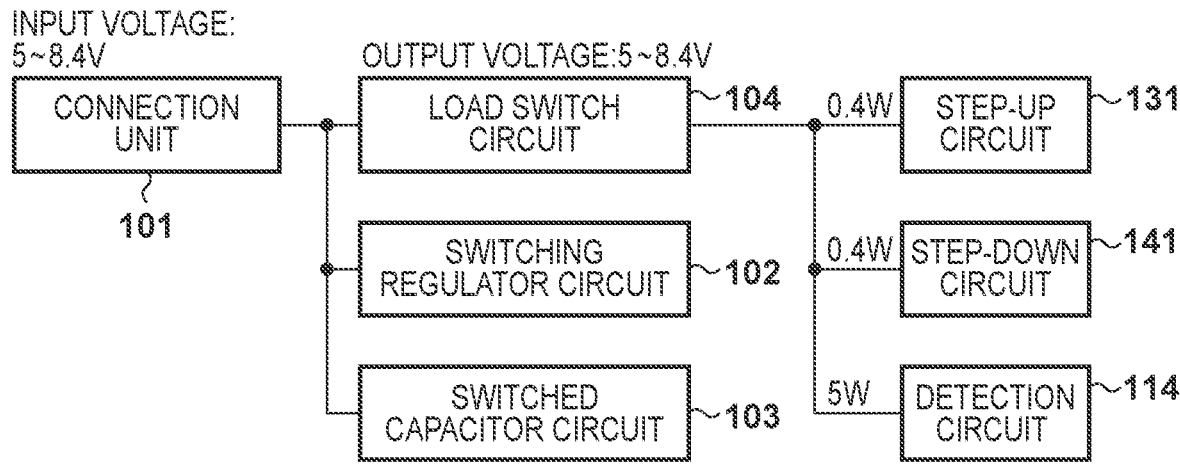
FIGS. 9A-9E are diagrams illustrating an example of a power supply path.
Figure 9B:
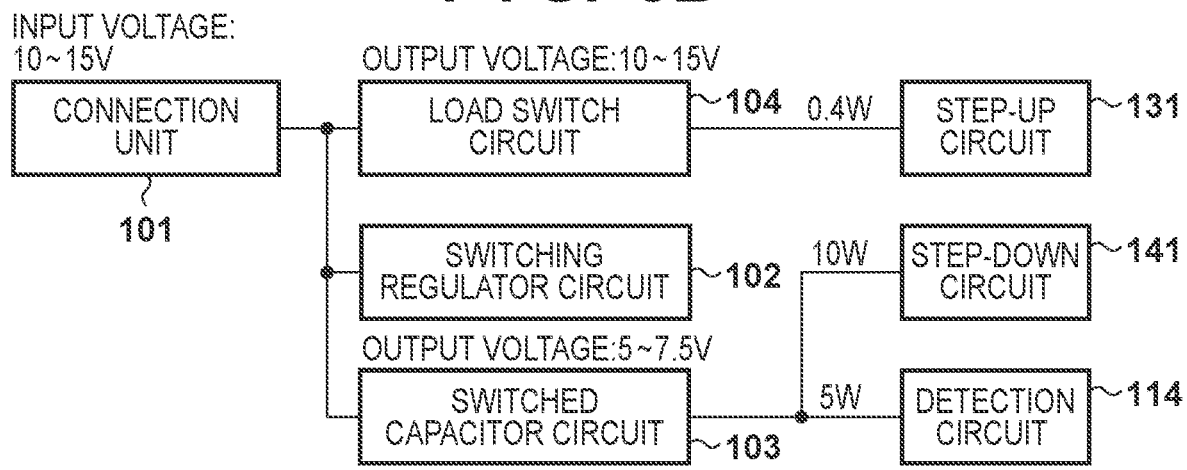
Figure 9C:
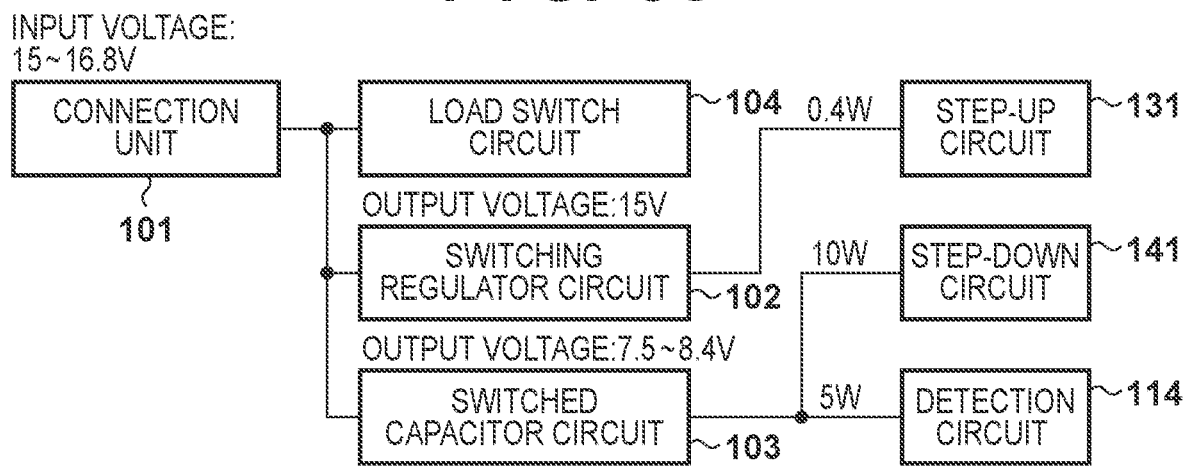

FIG. 9A shows the power supply paths selected in steps S803 and S806. FIG. 9B shows the power supply paths selected in steps S804 and S806. FIG. 9C shows the power supply paths selected in steps S804 and S807. In FIGS. 9A-9C, the input-voltage and the power supply paths are selected so that the power consumption is most suppressed in the condition described with reference to FIGS. 7A-7C.

In step S808, the system control unit 115 acquires the charging voltage and the charging current detected by the detection circuit 114 from the detection circuit 114.

In step S809, the system control unit 115 determines whether or not the charging of the battery 113 is completed. If it is determined that the charging of the battery 113 is completed, the system control unit 115 ends the process 800. If it is determined that the charging of the battery 113 is not completed, the system control unit 115 advances the process 800 to step S810.

In step S810, the system control unit 115 determines, based on the charging voltage and the charging current obtained in step S808, the voltage to be required for the power supply device connected to the connection unit 101. Then, the system control unit 115 requests the power supply device to change the supply voltage of the power supply device to the determined voltage. The system control unit 115, when the electronic device 100 is in the standby mode (when performing the process of step S803), since the voltage from the connection unit 101 via the load switch circuit 104 is supplied directly to the battery 113, requests a voltage corresponding to the charging voltage to the battery 113. The system control unit 115, when the electronic device 100 is in the moving image recording mode (when performing the process of step S804), since the voltage is supplied via the switched capacitor circuit 103 to the battery 113, requests a voltage corresponding to twice the charging voltage to the battery 113. The system control unit 115 returns the process 800 to step S802 after the voltage change request is made.

In step S811, the system control unit 115 determines whether the operation mode of the electronic device 100 is the standby mode or the moving image recording mode. If it is determined that the operation mode of the electronic device 100 is the standby mode, the system control unit 115 advances the process 800 to step S812. If it is determined that the operation mode of the electronic device 100 is the moving image recording mode, the system control unit 115 advances the process 800 to step S813.

In step S812, the system control unit 115 puts the switch circuit 121 and the switch circuit 128 to be the ON state and puts the switch circuits 122, 123, 124, 125, 126, 127 and 129 to be the OFF state. Thus, power is supplied to the step-up circuit 131 via the load switch circuit 104 and power is supplied to the step-down circuit 141 via the switched capacitor circuit 103.

In step S814, the system control unit 115 requests the power supply device connected to the connection unit 101 to change the supply voltage to 15V.

In step S813, the system control unit 115 puts the switch circuit 121 and the switch circuit 122 to be the ON state and puts the switch circuits 123, 124, 125, 126, 127, 128 and 129 to be the OFF state. Thus, power is supplied to the step-up circuit 131 and the step-down circuit 141 via the load switch circuit 104.

In step S815, the system control unit 115 requests the power supply device connected to the connection unit 101 to change the supply voltage to 5V.

In step S816, the system control unit 115 determines whether or not the operation mode of the electronic device 100 is ended. If it is determined that the operation mode of the electronic device 100 is ended, the system control unit 115 ends the process 800. If it is determined that the operation mode of the electronic device 100 is not ended, the system control unit 115 returns the process 800 to step S811.

Figure 9D:
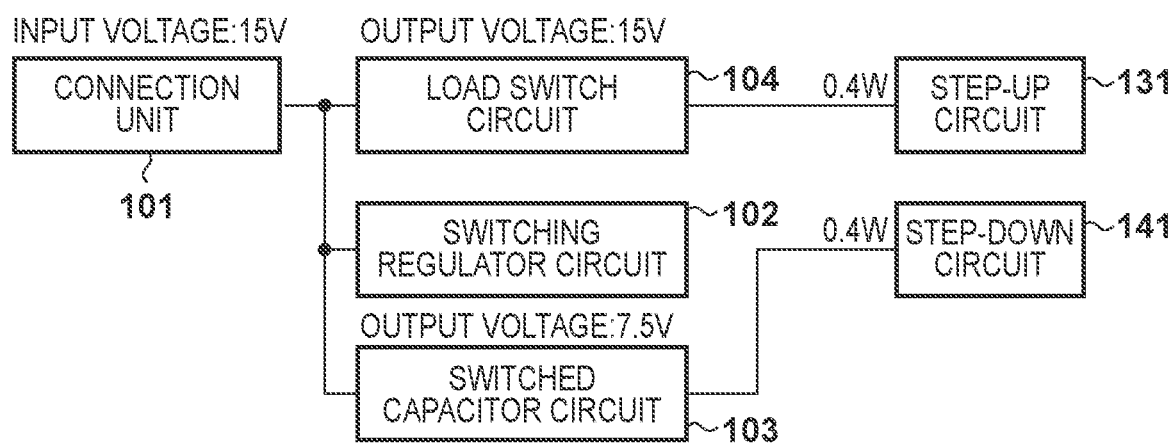
Figure 9E:
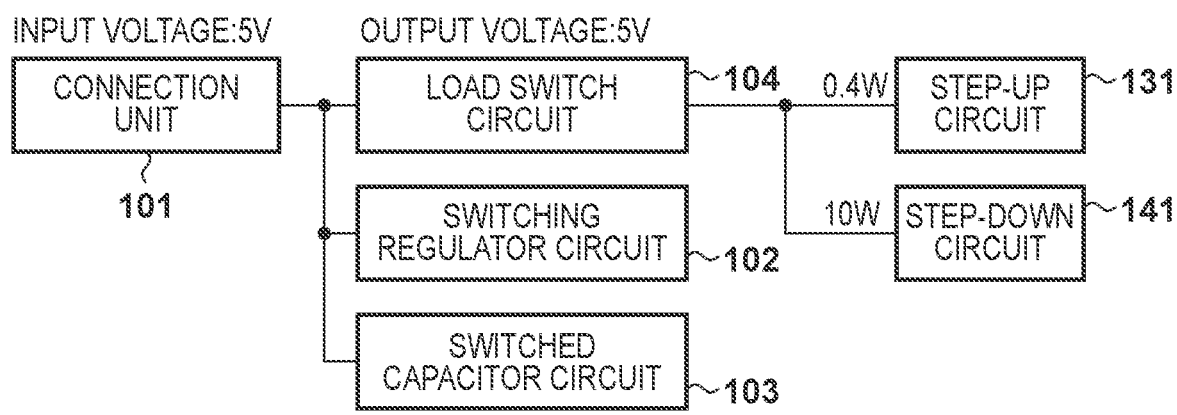

FIG. 9D shows the power supply paths selected in steps S812 and S814. FIG. 9E shows the power supply paths selected in steps S813 and S815. In FIGS. 9D and 9E, the input voltage and the power supply paths are selected so that the power consumption is most suppressed in the condition described with reference to FIGS. 7A-7C.

According to the first embodiment, when receiving power supplied from the outside, the input voltage and the power supply path can be selected so as to most suppress the power loss in accordance with the operation mode of the electronic device 100 and the charging state of the battery 113.

Second Embodiment

Various kinds of functions, processes, or methods described in the first embodiment can also be realized by a personal computer, a microcomputer, a CPU (Central Processing Unit), or the like with a program. In a second embodiment, a personal computer, a microcomputer, a CPU, or the like will be called a "computer X" below. Also, in the second embodiment, a program for controlling the computer X and realizing various kinds of functions, processes, or methods described in the first embodiment will be called a "program Y".

Various kinds of functions, processes, or methods described in the first embodiment are realized by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-004667, filed Jan. 15, 2020, which is hereby incorporated by reference herein in its entirety.

What is claimed is:

1. An electronic device comprising:
a CPU that executes a program stored in a memory and causes the electronic device to function as:
a power receiving unit that receives power from an external device;
a first voltage conversion unit that generates a first output voltage regardless of a variation of an input voltage;
a second voltage conversion unit in which a second output voltage varies due to a variation of the input voltage;
a voltage supply unit that steps up or down the first output voltage or the second output voltage and supplies the stepped up voltage or the stepped down voltage to a load circuit of the electronic device; and
a control unit that performs control so as to supply power to the load circuit of the electronic device by switching to the first voltage conversion unit or the second voltage conversion unit based on a voltage supplied to the load circuit of the electronic device.

2. The electronic device according to claim 1, further comprising:
a voltage output unit that inputs the power received by the power receiving unit and outputs a voltage to the voltage supply unit without performing a voltage conversion with respect to the input voltage; and
a switch unit that switches a unit that outputs a voltage to the voltage supply unit to at least one of the first voltage conversion unit, the second voltage conversion unit and the voltage output unit.

3. The electronic device according to claim 2, wherein the voltage supply unit includes a step-up unit connected between the output of the switch unit and a first load circuit and a step-down unit connected between the output of the switch unit and a second load circuit,
wherein a power consumption of the first load circuit is greater than a power consumption of the second load circuit,
wherein an operation mode of the electronic device can be switched to any one of a first operation mode in which a power consumption by the step-down unit is relatively small and a second operation mode in which a power consumption by the step-down unit is relatively large, and
wherein the control unit controls switching the switch unit, based on the operation mode of the electronic device.

4. The electronic device according to claim 3, wherein the step-up unit has a higher conversion efficiency as a voltage inputted to the step-up unit is higher, and
wherein the step-down unit has a higher conversion efficiency as a voltage inputted to the step-down unit is lower.

5. The electronic device according to claim 2, wherein the control unit controls the switch unit so as to switch the unit that outputs the voltage to the voltage supply unit to the voltage output unit, the voltage output unit and the second voltage conversion unit, or the first voltage conversion unit and the second voltage conversion unit, in a case where a battery is charged with power received by the power receiving unit, and
wherein the control unit controls the switch unit so as to switch the unit that outputs the voltage to the voltage supply unit to the voltage output unit, or the voltage output unit and the second voltage conversion unit, in a case where the battery is not charged with power received by the power receiving unit.

6. The electronic device according to claim 2, wherein the switch unit further outputs the voltage from one of the first voltage conversion unit, the second voltage conversion unit and the voltage output unit to a battery so as to charge the battery,
    wherein the control unit requests the external device to change a voltage to be supplied to the electronic device in accordance with a charging voltage of the battery.

7. The electronic device according to claim 1, wherein the first voltage conversion unit is a switching regulator circuit that includes a capacitor element, an inductor element and a switching element, and
    wherein the second voltage conversion unit is a switched capacitor circuit that includes a capacitor element and a switching element.

8. The electronic device according to claim 1, wherein the power receiving unit is compliant with Programmable Power Supply (PPS) of USB Power Delivery.

9. A method comprising:
causing a power receiving unit to receive power from an external device;
operating a first voltage conversion unit that generates a first output voltage regardless of a variation of an input voltage;
operating a second voltage conversion unit in which a second output voltage varies due to a variation of the input voltage;
causing a voltage supply unit to step up or down the first output voltage or the second output voltage and supply the stepped up voltage or the stepped down voltage to a load circuit of an electronic device; and
controlling such that power is supplied to the load circuit of the electronic device by switching to the first voltage conversion unit or the second voltage conversion unit based on a voltage supplied to the load circuit of the electronic device.

* * * * *